UNITED STATES PATENT OFFICE.

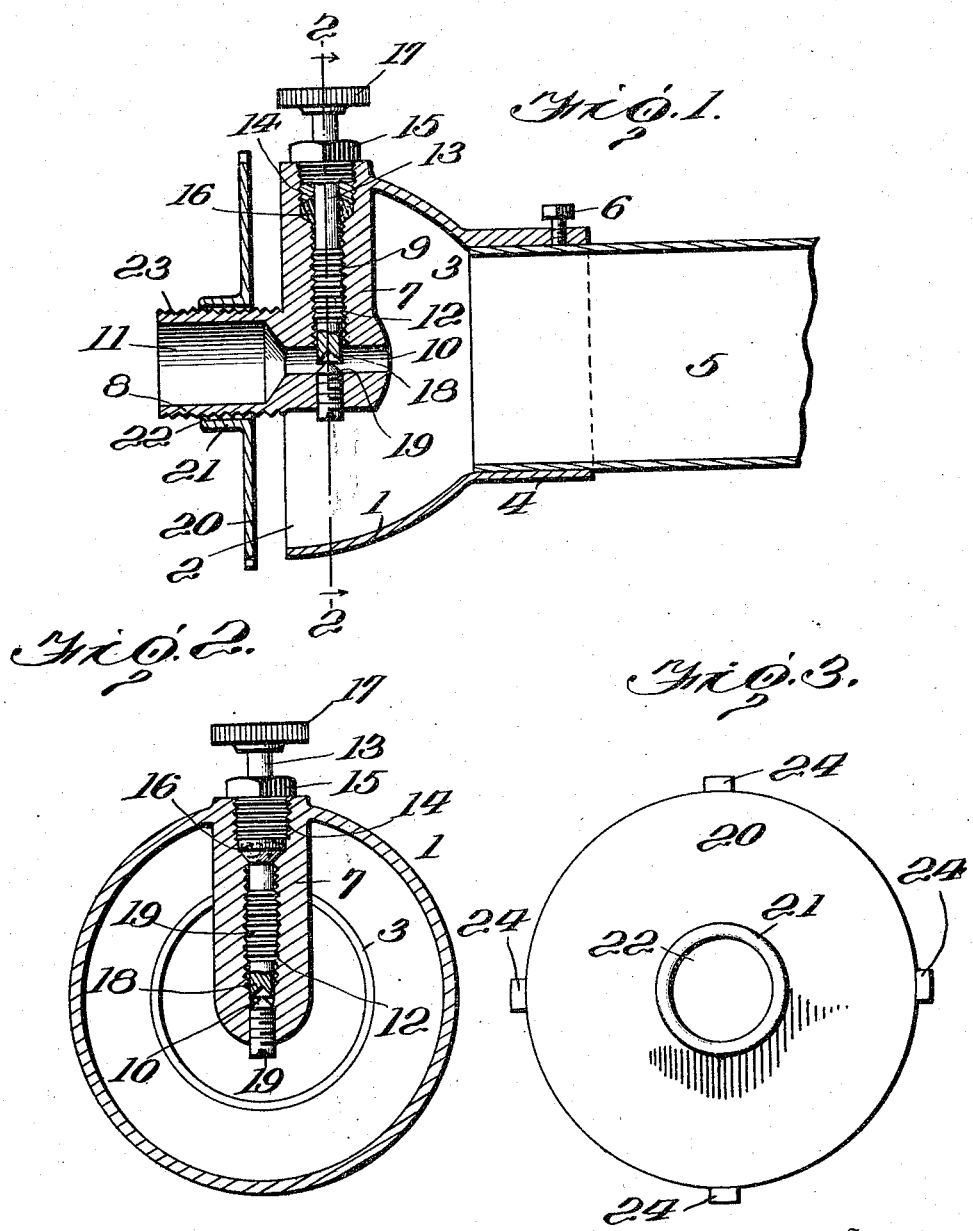

CLIFFORD D. ROBB, OF WEST VIEW, PENNSYLVANIA.

COMBINED GAS AND AIR MIXER AND CONTROLLER.

1,286,784.  Specification of Letters Patent.  Patented Dec. 3, 1918.

Application filed March 18, 1918. Serial No. 223,175.

*To all whom it may concern:*

Be it known that I, CLIFFORD D. ROBB, a citizen of the United States, residing at West View, in the county of Allegheny and State of Pennsylvania, have invented certain new and useful Improvements in Combined Gas and Air Mixers and Controllers, of which the following is a specification, reference being had therein to the accompanying drawing.

My invention relates to improvements in combined gas and air mixers and controllers, and the primary object of this invention is to provide a simple and cheap construction for regulating and controlling the amount of air and gas fed to a pipe or conduit through which it is fed to a burner or burners.

The improvement is particularly intended to supply a proper mixture of air and gas to burners for stoves, water heaters, hot air furnaces, steam and hot water boilers, etc., whereby proper combustion and maximum efficiency of the burners are accomplished.

In the accompanying drawings—

Figure 1 is a longitudinal central sectional view of a device embodying my invention.

Fig. 2 is a transverse sectional view on the line 2—2 of Fig. 1, looking in the direction indicated by arrow.

Fig. 3 is a front elevation of the adjustable air-controlling disk.

Referring now to the drawings my improvement comprises a body-portion 1, which is preferably made bell-shape with its larger and inlet end 2 extending outward, while its inner contracted end 3 is provided with a longitudinally extending annular flange 4. The flange 4 and pipe 5 telescope each other and fit tightly as shown, and are held together by a suitable clamping screw 6.

Projecting radially inward from the outer end of the bell-shaped body-portion 1, is an arm 7, which has its inner end beyond the center of the body member 1, and projecting outwardly from the arm 7 is an arm or member 8, the members 7 and 8 together constituting an L-shaped member.

The said arm 7 is provided with a longitudinally and centrally located screw-threaded passage 9, which has its inner end communicating with the gas passage 10, the latter extending transverse the passage 9 and located at a point which is the center of the axis of the bell-shaped body portion 1. This passage 10 communicates with an enlarged passage 11 formed in the outwardly extending member 8.

For the purpose of cheapness, the arms 7 and 8 are cast integral with each other, and the arm 7 cast integral with the body portion 1, and all three of these parts composed of cast-iron.

A screw threaded rod 12 engages the screw threads of the opening 9 and has its outer portion 13 smooth, and the outer end of the passage 9 is enlarged, as shown at 14, and screw-threaded to receive a nipple 15 for adjustably compressing a suitable packing 16 located within the enlarged portion 14 of the opening 9. This constitutes a stuffing-box for making the screw rod gas-tight and preventing the escape of gas through the openings 9 and 14. The outer end of the rod 13 is provided with a knurled head 17 by which the rod 13 is turned for the purpose of adjusting it. This rod 13 is made of a diameter corresponding with the diameter of the passage 10, whereby it will close completely the said passage 10 when desired. The lower end of the rod 13 is provided with a cone-shaped seat 18 adapted to coöperate with an adjustable cone-shaped screw 19.

The disk 20 has a flange 21, the outer end 22 of which extends inward and is adapted to engage the external screw thread 23 of the member 8. Preferably only the outer end of the flange 21 engages the screw-thread 23, whereby the whole flange need not be screw-threaded. This disk 20 is adjustable toward and away from the open end 2 of the bell-shaped member 1, and thereby controls the amount of air that is admitted thereto. For the purpose of facilitating the turning of this disk 20, it is provided with a plurality of projecting studs 24, whereby it may be readily turned for adjustment.

In operation gas is supplied to the passage 11 of the arm 8 through any suitable pipe (not shown) and the amount of gas flowing to the bell-shaped body 1 is regulated and controlled by the adjustable rod 13, while the amount of air admitted is controlled by adjusting the disk 20. The gas and air meet as the gas flows from the inner end of the passage 10 and are thoroughly combined and mixed as they pass through the pipe 5 to the burner or burners.

I am aware that devices which embody a valve for controlling the gas flow and an adjustable disk for controlling the air flow have heretofore been used, but they have been differently constructed from my improvement, which is defined in the appended claims.

Having thus described my invention, what I claim and desire to secure by Letters Patent is:

1. A gas and air mixer for burners having an open ended body, an L-shaped member having one arm thereof extending radially inward from the open end of the said body-portion and the other arm extending outwardly, a gas passage passing through the outwardly extending arm and the inner end of the inwardly extending arm, a valve passing through the inwardly extending arm and controlling the said passage, and a disk adjustably supported upon the outwardly extending arm and adapted to be moved toward and away from the open end of the body portion, substantially as described.

2. A gas and air mixer for burners of the character described, the improvement comprising an open ended body; an L-shaped member extending radially inward from the open end of said body portion, one arm of the L extending outwardly and having a passage therethrough and through the inner end of the arm extending radially inward, the inwardly extending arm carrying a valve controlling the said passage, the outwardly extending arm having external screw threads, and a disk mounted on the screw threads and adjustable toward and away from the open end, for the purpose described.

3. A gas and air mixer for burners, comprising a body portion having an open outer end, an L-shaped member mounted in the open end of the body portion with one arm extending radially inward from the wall of the body portion and its outer surface approximately in the plane of the outer open end of the body portion, the other arm extending outward and having an inlet passage passing therethrough and through the inner end of the inwardly extending arm, a disk mounted on the outwardly extending arm and adjustable toward and away from the open end to control the passage of air through the open end, and a valve passing through the inwardly extending arm and controlling the flow of gas through the passage of the L-shaped member, substantially as shown.

4. A combined air and gas mixer, comprising a bell-shaped body portion having its largest end open, an L-shaped member supported within the open end with the juncture of the L substantially at the center of the body-portion, a gas passage extending through the juncture of the two arms of the L-shaped member and longitudinally of the body-portion, one arm of the L-shaped member extending radially inward from the outer end of the bell-shaped body-portion, a rod passing longitudinally through the radially extending arm and having its inner end acting to control the gas passage and its outer end projecting beyond the body portion and adapted to turn for regulating the valve, the other arm of the L extending outward and externally screw-threaded, and a disk carried on the second said arm and adjustable in and out on the screw thread for controlling the air fed to the body portion, whereby the gas and air fed through the mixer are separately controlled.

In testimony whereof I hereunto affix my signature in the presence of two witnesses.

CLIFFORD D. ROBB.

Witnesses:
THOMAS M. BOYD,
CAREY WHITE.

Copies of this patent may be obtained for five cents each, by addressing the "Commissioner of Patents, Washington, D. C."